(12) United States Patent
Lefebvre

(10) Patent No.: US 8,767,679 B2
(45) Date of Patent: Jul. 1, 2014

(54) PHYSICAL CHANNEL ESTABLISHMENT

(75) Inventor: Damien Lefebvre, Roquefort les Pins (FR)

(73) Assignee: Icera, Inc., Wilmington, DE (US)

( * ) Notice: Subject to any disclaimer, the term of this patent is extended or adjusted under 35 U.S.C. 154(b) by 572 days.

(21) Appl. No.: 12/808,050

(22) PCT Filed: Nov. 28, 2008

(86) PCT No.: PCT/EP2008/066453
§ 371 (c)(1),
(2), (4) Date: Aug. 24, 2010

(87) PCT Pub. No.: WO2009/077310
PCT Pub. Date: Jun. 25, 2009

(65) Prior Publication Data
US 2010/0322191 A1 Dec. 23, 2010

(30) Foreign Application Priority Data
Dec. 14, 2007 (GB) .................................. 0724435.3

(51) Int. Cl.
 H04W 4/00 (2009.01)
 H04W 36/30 (2009.01)
 H04W 72/08 (2009.01)
 H04W 72/12 (2009.01)
 H04L 5/00 (2006.01)
(52) U.S. Cl.
 CPC ............ *H04W 36/30* (2013.01); *H04W 72/085* (2013.01); *H04W 72/1231* (2013.01); *H04L 5/006* (2013.01)
 USPC ........... 370/332; 370/431; 370/509; 455/436; 455/452.1; 709/226

(58) Field of Classification Search
 None
 See application file for complete search history.

(56) References Cited

U.S. PATENT DOCUMENTS

| 7,372,825 B1 * | 5/2008 | Schmidl et al. ............... 370/328 |
| 2007/0129075 A1 * | 6/2007 | Kim et al. ..................... 455/436 |
| 2008/0137637 A1 * | 6/2008 | Cho et al. ...................... 370/349 |

FOREIGN PATENT DOCUMENTS

| WO | 02058280 A1 | 7/2002 |
| WO | 2007008465 A1 | 1/2007 |
| WO | 2009077310 A1 | 6/2009 |

OTHER PUBLICATIONS

3GPP, "Universal Mobile Telecommunications System (UMTS); Radio Resource Control (RRC); Protocol Specification", 3GPP TS 25.331 v7.6.0, Release 7, Sep. 2007.*
Universal Mobile Telecommunications System; Radio Resource Control; Oct. 1, 2007; XP014040020; p. 153, paragraph 8.2.2.7-154; p. 263, paragraph 8.5.4; p. 277-278, paragraph 8.5.15.2.

* cited by examiner

*Primary Examiner* — Khoa Huynh

(57) ABSTRACT

There is disclosed a method of controlling physical channel establishment in a wireless communication system, which method comprises: a.) determining if decoding of a system frame number is required as part of an initialization of a physical channel establishment procedure; b.) if decoding of the system frame number is not required, initializing a decoding of a system frame number for the channel to be established; and c.) if the decoding of the system frame number fails, terminating the channel establishment procedure.

11 Claims, 3 Drawing Sheets

PHYSICAL CHANNEL ESTABLISHMENT

CROSS REFERENCE TO RELATED APPLICATION

This application is the National Stage of, and therefore claims the benefit of International Application No. PCT/EP2008/066453 filed on Nov. 28, 2008, entitled "PHYSICAL CHANNEL ESTABLISHMENT," which was published in English under International Publication Number WO 2009/077310 on Jun. 25, 2009, and has priority based on GB 0724435.3 filed on Dec. 14, 2007. Each of the above applications is commonly assigned with this National Stage application and is incorporated herein by reference in their entirety.

TECHNICAL FIELD

The invention is concerned with the establishment of a dedicated physical channel in a wireless communications system. The invention is concerned with embodiments where system frame number timing is to be maintained between an existing channel and a channel to be established. The invention is particularly concerned with the establishment of such a channel when a system frame number decoding would not normally be required. In particular the invention is concerned with the establishment of such a channel in a case where a system frame number decoding of a target cell before channel establishment is not explicitly or implicitly requested by a 3GPP specification to achieve the given channel establishment.

BACKGROUND

Mobile communication systems are well-known, a universal mobile telecommunications system (UMTS) being an example of such a known system. In a UMTS system, a mobile device, known as a user equipment (UE), connects to a mobile communications network infrastructure via one or more node-Bs. A dedicated physical channel is established between the user equipment and one of the node-Bs to allow data communication to take place therebetween.

Each node-B in a UMTS system supports one or more cells of radio coverage. As a user equipment roams, it is necessary for a handover of the dedicated physical channels to take place from cell-to-cell. Techniques are well-known in the art for facilitating such handover. Such techniques typically rely upon the network side of the system assessing parameters measured at the user equipment, to determine if the carrier signal strengths are such that it would be appropriate to handover to a different cell. There are various different types of handover, which can be broadly split into the categories of soft handover and hard handover. Hard handover comprises either intra-frequency hard handover or inter-frequency hard handover.

In certain types of hard handover, there is a requirement for the system frame number (SFN) timing to be maintained between the existing dedicated physical channel and the newly established dedicated physical channel after handover. In this case, the 3GPP specification does not require the decoding of the SFN of the target cell before establishment of the channel.

In hard handover, following a decision by the network side to perform a handover, based on measurement of carrier signals received at the user equipment, the node-B allocates resources to the channel on which the dedicated physical channel is to be established. Thereafter an instruction to reconfigure the dedicated physical channel is sent to the user equipment, and a synchronization procedure and physical channel establishment procedure initiated. A problem arises in that the allocation of resources to the new channel may take some time in the node-B, for example of the order of a few seconds. This delay may be because the node-B is overloaded. Thus by the time the user equipment receives the message to reconfigure the physical channel, the radio conditions may have changed to such an extent that the quality of the radio signal on the proposed new channel has deteriorated below the quality of the radio signal on the existing channel. The physical channel establishment procedure associated with the synchronization procedure may not succeed for the proposed new channel if the channel conditions have deteriorated to such an extent that radio contact can simply no longer be detected. This will be continued with until a 'Physical Channel Establishment Failure' is detected. The synchronization phase is controlled by a timer, the timing-out of the timer indicating that a Physical Channel Establishment Failure has occurred, due to synchronization being lost.

The timer may not time-out, however, for a notable period of time, for example 15 seconds. During this time the establishment of the new dedicated physical channel is attempted, with no prospect of success. Only when the timer times-out can the node-B initialize re-establishment of the previous dedicated physical channel. Such failure would be apparent to an end-user.

It is an aim of the invention to provide an improved technique for controlling the initialization/establishment of a new dedicated physical channel in embodiments where it is necessary to maintain system frame number timing between the new dedicated physical channel and the previous dedicated physical channel.

It is a further aim of the invention to provide an improved technique for controlling the initialization/establishment of a new dedicated physical channel in embodiments where the 3GPP specification does not require to decode the SFN of the target cell before establishment of the channel.

SUMMARY

In one aspect there is provided a method of controlling physical channel establishment in a wireless communication system, which method comprises: (a.) determining if decoding of a system frame number is required as part of an initialization of a physical channel establishment procedure; (b.) if decoding of the system frame number is not required, initializing a decoding of a system frame number for the channel to be established; and (c.) if the decoding of the system frame number fails, terminating the channel establishment procedure.

In another aspect, there may be provided a computer program for carrying out the method described above.

In yet another aspect, there may be provided a computer program product for storing computer program code which, when run on a computer, carries out the method described above.

The invention also provided an apparatus for controlling physical channel establishment in a wireless communication system, comprising: (a.) means for determining if decoding of a system frame number is required as part of an initialization of a physical channel establishment procedure; (b.) means for initializing, if decoding of the system frame number is not required, a decoding of a system frame number for the channel to be established; and (c.) means for terminating, if decoding of the system frame number fails, the channel establishment procedure.

The invention also provides a user equipment of a mobile communications system including the apparatus described above.

BRIEF DESCRIPTION OF THE DRAWINGS

The invention will now be described, by way of example, with reference to the accompanying figures in which.

DETAILED DESCRIPTION

Figure 1:
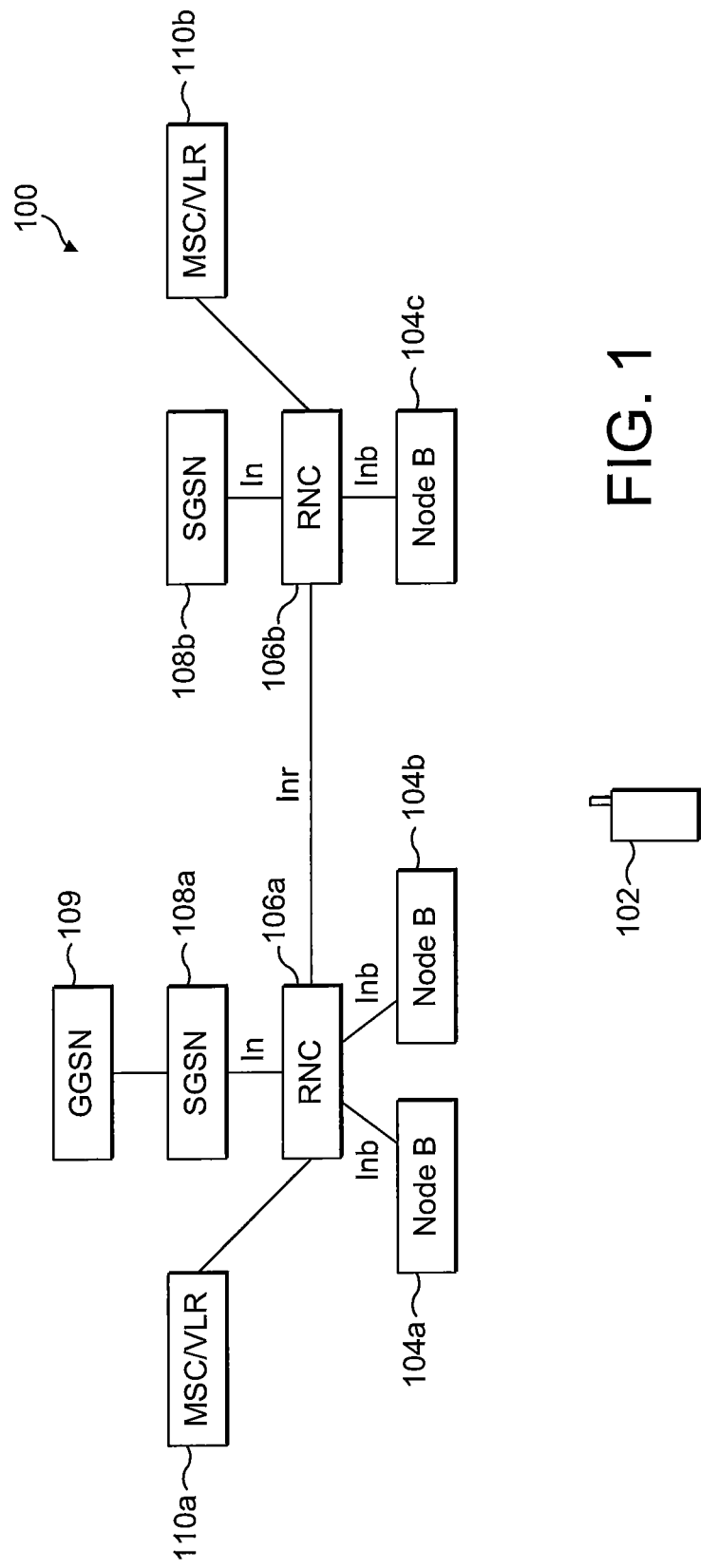
FIG. 1 illustrates elements of a UMTS mobile communication system in which embodiments of the invention may be implemented.

Those skilled in the art to which this application relates will appreciate that other and further additions, deletions, substitutions and modifications may be made to the described embodiments. With reference to FIG. 1, there is illustrated main elements of a UMTS mobile communication system as known in the art, generally denoted by reference numeral 100. It will be understood that FIG. 1 does not represent a full implementation of a UMTS mobile communication system. Only sufficient elements of the system are shown in order to present the context of the embodiments of the invention.

Reference numeral 102 denotes a user equipment, being representative of a plurality of user equipments which may connect wirelessly to the mobile communication system. The user equipment 102 establishes communications with the mobile communication system via one or more node-Bs, three of which are illustrated in FIG. 1 and denoted by reference numerals 104a, 104b and 104c.

Each of node-Bs 104a and 104b is associated with a radio network controller (RNC) 106a. The radio network controller 106 is connected to a serving GPRS (general packet radio services) support node (SGSN) 108b. The SGSN 108b is in turn connected to a gateway GPRS support node (GGSN) 109.

Node B 104c is similarly associated with a RNC 106b. The RNC 106b is connected to an SGSN 108b, which may in turn be connected to a further GGSN, or may be connected to the GGSN 108a. Each of the RNCs 106a and 106b is connected to a respective mobile switching center (MSC)/visitor location register (VLR), 110a and 110b respectively. The radio network controllers 106a and 106b are connected by an interface.

The structure of a UMTS mobile communication system as illustrated in FIG. 1 is well-known to one skilled in the art, and the further operation of such a system is not described herein.

As the user equipment 102 roams, it is necessary for handover to take place as the carrier signal from a given node-B weakens and carrier signals from other node-B's strength in relation to the user equipment's position. Handover is a concept which is well-known in the art, and typically falls into two categories: soft handover and hard handover.

Hard handover occurs when the radio links with the user equipment change and there are no radio links that are common before the handover procedure is initiated and after the procedure is completed. Two types of hard handover are intra-frequency hard handover and inter-frequency hard handover.

For intra-frequency hard handover, the frequency remains the same. Inter-frequency hard handover occurs when hierarchical cells are present. In this case the frequency at which the user equipment operates changes. This may occur, for example, when a current cell is congested, or as the user equipment roams.

Hard handover procedures can be initiated by the network or by the user equipment. An example of an embodiment in which hard handover takes place will now be described with reference to FIG. 2.

For the purposes of a described example, there is assumed an embodiment where the user equipment 102 has established a dedicated physical channel with node-B 104a. Due to a handover, as discussed herein below, a decision is made to establish a new dedicated physical channel between the user equipment 102 and node-B 104b.

Figure 2:
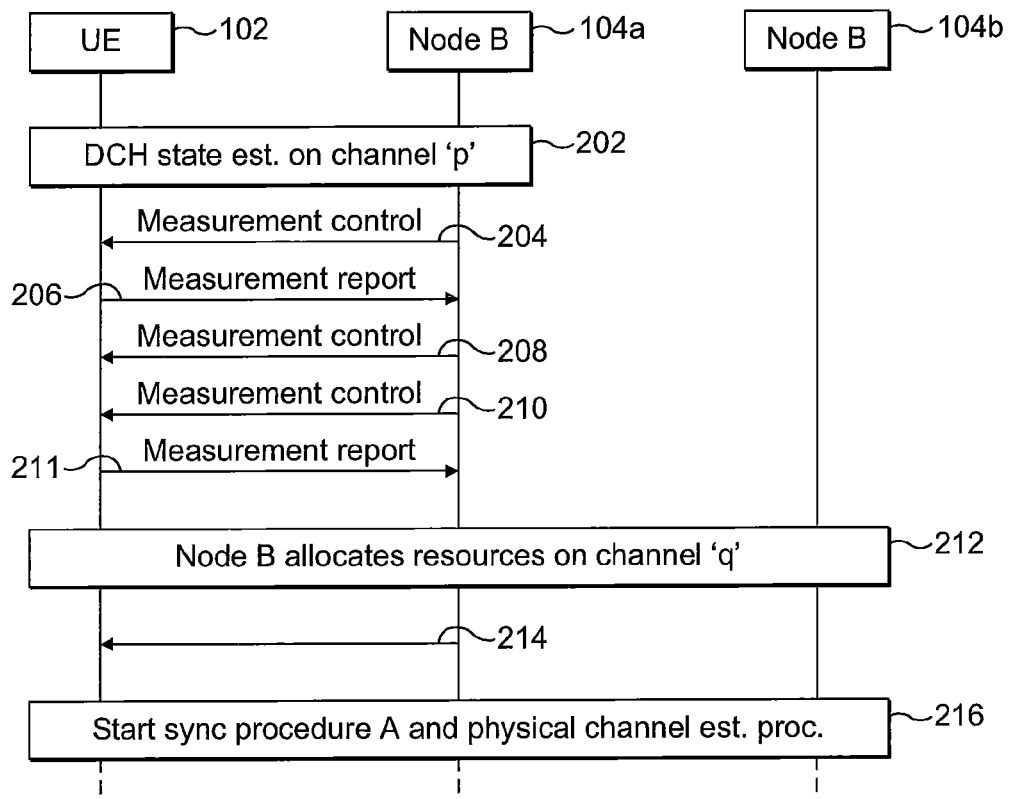
FIG. 2 illustrates partial signalling between a user equipment and a node-B in one embodiment.

Referring to FIG. 2, there is illustrated a block representing each of the user equipment 102, node-B 104a, and node-B 104b. Certain signaling between these elements in an embodiment is illustrated.

As illustrated in FIG. 2 by reference numeral 202, a dedicated physical channel state is established on a channel, denoted as channel "p", between the user equipment 102 and the node-B 104a.

At a particular time instance, the node-B 104a transmits a measurement control message as denoted by signal 204 to the user equipment 102. The measurement control message is sent by the node-B 104a, after the node-B 104a determines that inter-frequency or intra-frequency measurements need to be performed. The measurement control message 204 will typically include a "measurement type" field or parameter to determine the type of measurements which are to be made, as known in the art.

Generally the measurement control message will also send an event, from amongst a set of predetermined events.

In the example of FIG. 2, it is assumed that the measurement control message 204 sends an "event 2d" message. An event 2d message indicates that the estimated quality of the currently used carrier frequency is below a predetermined threshold.

Responsive to the measurement control message 204 denoting an "event 2d", the user equipment 102 measures the signal strength of carriers received at the user equipment, and returns a measurement report message to the node-B 104a as denoted by signal 206. The measurement report message will be an "event 2d" measurement report. This measurement report provides the node-B 104a with signal quality information from the user equipment's perspective, and enables the node-B to determine a new carrier frequency which would be more suitable for establishing connection with the user equipment.

In preparation for the establishment of a new channel, the node-B 104a then transmits a measurement control message 208 of the type "event 2b". An "event 2b" message indicates to the user equipment 102 that the estimated quality of the currently used frequency is below a certain threshold and the estimated quality of a non-used frequency is above a certain threshold.

The Node-B also transmits a further measurement control message 210 to the user equipment 102. The measurement control message 208 is for compressed gap frequency division duplex purposes.

Thereafter the user equipment transmits a further measurement report message as denoted by signal 211, being a report responsive to the "event 2b" measurement control signal 208.

The measurement report message 211 provides the node-B 104a with confirmation of the current signal conditions at the user equipment's receiver, and therefore provides confirmation to the node-B 104a of the need to switch frequencies. This is on the assumption that the signal measurements have not changed since the measurement report message 206. If the signal conditions have changed, the measurement report message 211 will inform of such.

The node-B 104b then initiates the allocation of resources on a channel "q", being the new channel which has been selected for the establishment of a dedicated physical channel for the user equipment. This is denoted by a functional block identified by a reference numeral 212 in FIG. 2.

Thereafter the node-B 104a transmits a physical channel reconfiguration message as denoted by signal 214 to the user equipment 102. This identifies to the user equipment the channel to which the dedicated physical channel is to be switched.

A synchronization procedure as known in the art, known as synchronization procedure A, is then started, and a physical channel establishment procedure for the establishment of the dedicated physical channel on channel "q" is established. This is denoted a functional block identified by reference numeral 216.

The signaling and steps described with reference to FIG. 2 are signaling and steps known from the art. It will be appreciated by one skilled in the art that the instigation of a handover may arise in a variety of different ways, and FIG. 2 merely represents an example.

In prior art, for an embodiment in which it is necessary to retain a system frame number (SFN) timing between the "old" dedicated physical channel and the "new" dedicated physical channel, the synchronization and establishment procedure denoted by reference numeral 216 takes place until the channel is established or until a 'Physical Channel Establishment Failure' occurs. A prior art problem is that there may be a delay, of the order of a few seconds, between the allocation of the resources in Node-B 104b denoted by reference numeral 212, and a receipt by the user equipment 102 of the physical channel reconfiguration message signal 214. Because of the delays caused by the allocation of resources in the node-B 104b, which may for example be due to the node-B being overloaded, the radio conditions in the channels may have changed by the time the physical channel reconfiguration message is sent to the user equipment. By this time, the conditions on the proposed new channel may be worse than on the existing channel.

However as the physical channel reconfiguration message has been transmitted, the user equipment will continue to attempt to establish the dedicated physical channel on the new channel. However if the signal quality has deteriorated sufficiently, it will be impossible to establish this channel. However neither the user equipment 102 nor the node-B 104a is able to determine the fact that the signal quality has deteriorated, and therefore have no way of terminating the attempt to establish the new dedicated physical channel with Node-B 104b.

The non-establishment of the physical channel is then determined on the user equipment side by the loss of synchronization. The loss of synchronization forces a failure in the establishment procedure. After the failure, the user equipment must initialize a re-establishment with the old channel.

The timer which traces a time-out for loss of synchronization may take a long time to cause a failure, in the region of 15 seconds. Thus the system is without an established connection for a significant period of time, during which time there is no possibility of establishing the connection, and thereafter a new establishment must be initiated.

Figure 3:
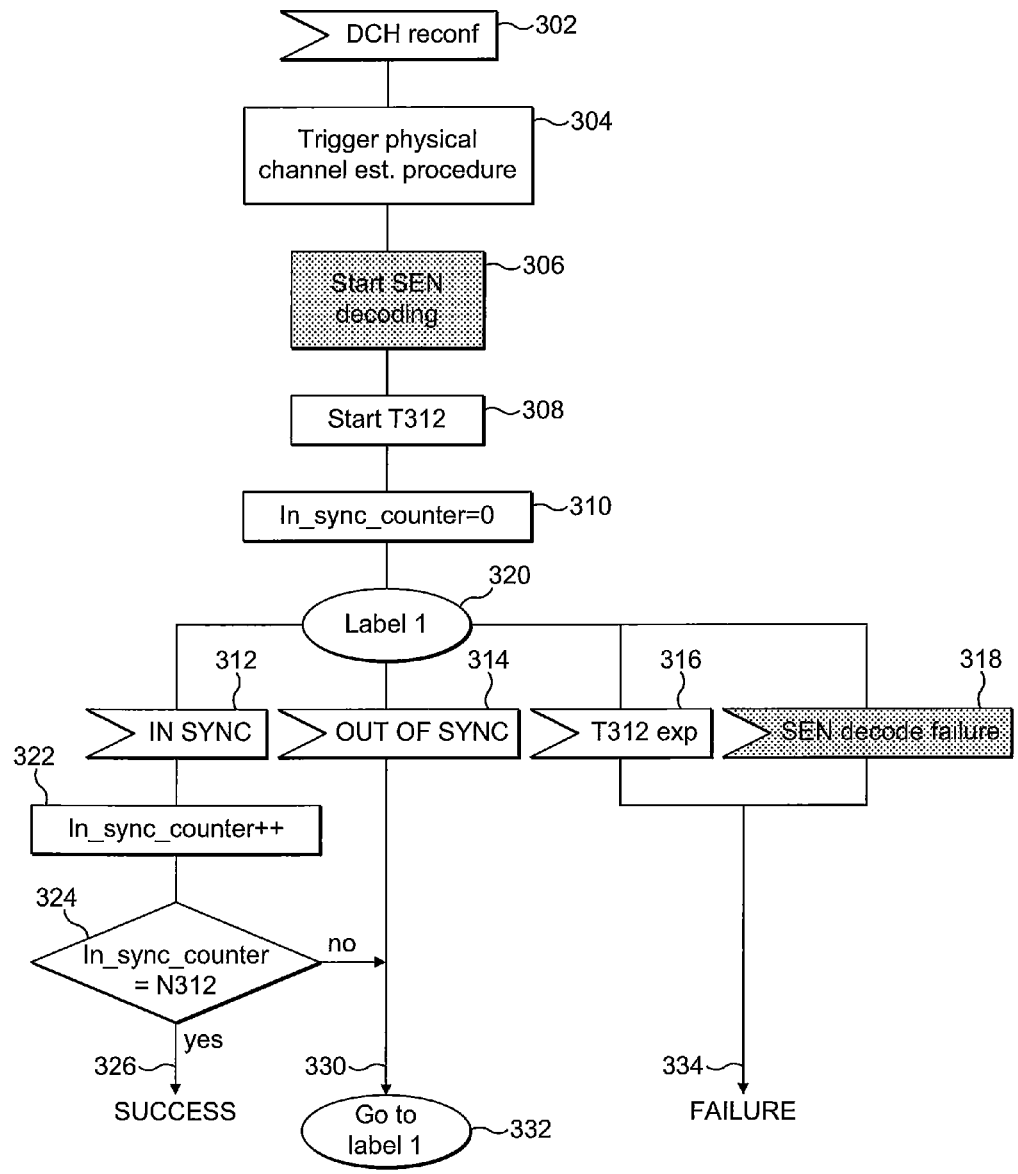
FIG. 3 illustrates a flow process for implementation of an embodiment according to the invention.

In accordance with the invention the known techniques for establishing a dedicated physical channel on a new channel are adapted, as is now discussed further with reference to the flow chart of FIG. 3.

A step 302 denotes the dedicated physical channel reconfiguration, specifically that a decision has been taken to reconfigure the dedicated physical channel in accordance with the process described above with reference to FIG. 2.

A step 304 denotes the triggering of the physical channel establishment procedure, corresponding to the function denoted by reference numeral 216 in FIG. 2.

In accordance with the invention, a further measurement takes place in a step 306 at the user equipment 102. In one embodiment, an additional system frame number measurement is triggered in the user equipment 306 responsive to the physical channel reconfiguration message 214. In this step, the user equipment attempts to decode a signal from the channel, channel "q", to which the dedicated physical channel is to be switched.

In a step 308 a "T312" timer is started, being the timer which indicates the maximum duration allowed for the Physical Channel Establishment.

As discussed hereinabove, the problem which the invention addresses is associated with the relatively long time it takes for the T312 timer, initiated at step 308, to time-out. The decoding of the system frame number in step 306 takes a much shorter length of time than the timing out of the timer T312. Thus in the event that signal conditions are deteriorated such that the signal from the new channel with which a connection is to be established has deteriorated, this is determined quickly by the SFN decoding step 306.

In a step 310 a synchronous counter is set to zero, and timer T312 is started.

The initialization of the new dedicated physical channel establishment in accordance with this embodiment of the invention will result in one of four outcomes, generally identified by four states in FIG. 3.

In a first state generally denoted by reference numeral 312 there is determined, using blocks 32 and 324, the number of frames successfully synchronized (IN_SYNC). If the number of synchronized frames is equal to N312, a 'Physical Channel Establishment Success' is detected, and an appropriate signal set on line 326.

In a second state generally denoted by reference numeral 314 it is determined whether a frame is unsuccessfully synchronized (OUT_OF_SYNC). There is no specific action on determination of this event.

In the event that a failure is detected in either of the first and second states 312 and 314, a signal is set on line 330 and a 'go to Label 1' instruction executed as known in the art.

In a third state generally denoted by reference numeral 316 it is detected whether the "T312" timer expires, i.e., whether the time allowed for channel establishment has expired.

In a fourth state denoted by step 318 it is detected whether the SFN decoding initiated in step 306 has failed. In the event of failure in either step 316 or 318, a failure signal is set as denoted by line 334.

Once the establishment of the new dedicated physical channel is initiated, the first state which is likely to be determined is the SFN decode failure 318, in accordance with one embodiment of the invention. The SFN decode failure is likely to be determined reasonably quickly, by the user equipment failing to decode an SFN from the proposed new node-B element due to signal degradation. If an SFN decode failure 318 occurs, then the failure state is entered and a failure signal is generated on line 334.

FIG. 3 does not show the mechanisms for the establishment of the new dedicated physical channel, which mechanism will be familiar to one skilled in the art.

If the establishment of the new dedicated physical channel is completed without the failure line 334 being set, then the new dedicated physical channel is established and communication between the user equipment and node-B 104c is established.

Figure 4:
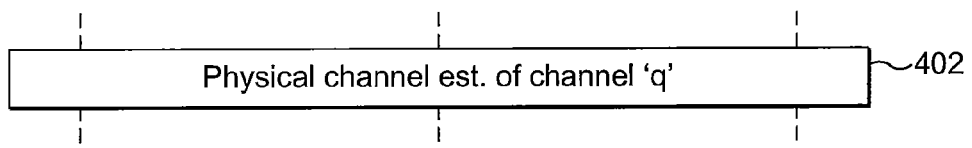
FIG. 4 illustrates the successful establishment of a new dedicated physical channel.

FIG. 4 illustrates, as denoted by reference numeral 402, the establishment of the new dedicated physical channel on a channel "q".

If the failure signal on line 334 is set before the new dedicated physical channel is established, then the user equipment initiates establishment of a dedicated physical channel on the previous channel, being channel "p" in the example described.

Figure 5:
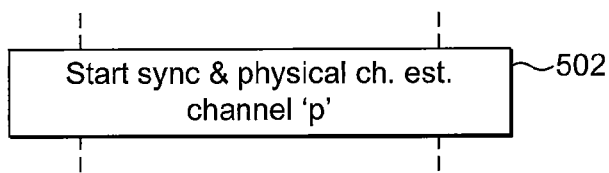
FIG. 5 illustrates the failure of the establishment of a new dedicated physical channel.

As shown in FIG. 5 and denoted by reference numeral 502, responsive to the failure signal on line 334 the user equipment starts synchronization of procedure A and physical channel establishment procedure for channel "p".

It should be noted that if the switch to the new channel for the dedicated physical channel is completed successfully before the failure signal on line 334 has been set, then the process of FIG. 3 is reset.

Thus in accordance with the invention there is provided an extra measurement to estimate the quality of the cell with which the new dedicated physical channel is to be established. It is assumed that if it is not possible to decode the SFN of the target cell, then the physical channel establishment procedure has no chance of being successful. If the SFN decoding fails, the physical channel establishment procedure is interrupted and a physical channel establishment failure is returned straightaway.

The duration of the SFN measurement is very short compared to T312. The duration of the SFN measurement may typically be a maximum of 200 ms (including several decoding attempts).

The embodiment of the present invention applies in scenarios where it not imposed by the 3GPP specification—or any other specification under which channel establishment operates—to decode the SFN of the target cell before establishment of the channel.

This is the case in inter-frequency hard handover or intra-frequency hard handover with timing maintained. This is also the case in an initialization for CELL_DCH state after a state transition, for example from IDLE state or FACH state.

Thus in accordance with one embodiment of the invention an SFN measurement is triggered in parallel with the channel establishment procedure for establishing a channel with the target cell.

The invention is particularly application to physical channel establishment techniques in accordance with 3GPP Release 5.

The foregoing description has described an embodiment for implementing the invention. The invention is not limited to specific embodiments, including apparatus and process steps, set forth in this description. Those skilled in the art will recognize that the invention has a broad range of applications, and that the described embodiments submit of a wide range of further modifications and applications. The scope of the invention is determined by the appended claims.

What is claimed is:

1. A method of controlling physical channel establishment in a wireless communication system, which method comprises:
   a.) determining if system frame number timing is to be maintained, and thereby determining if decoding of a system frame number is required as part of an initialization of a physical channel establishment procedure;
   b.) if the system frame number timing is to be maintained, thereby the decoding of the system frame number is not required to achieve the channel establishment, initializing a decoding of the system frame number to estimate the quality of a cell with which the physical channel is to be established; and
   c.) if the decoding of the system frame number fails, terminating the channel establishment procedure.

2. The method of claim 1 wherein the initialization of the physical channel establishment procedure is responsive to an inter-frequency hard-handover.

3. The method of claim 2 further comprising, if the decoding of the system frame number fails, initializing a physical channel establishment procedure for a previously established channel.

4. The method of claim 1 wherein the initialization of the physical channel establishment procedure is responsive to an intra-frequency hard-handover.

5. The method of claim 1 wherein the initialization of the physical channel establishment procedure is responsive to a state transition.

6. The method of claim 1 in which the determining step is dependent upon a standardized physical channel establishment procedure.

7. The method of claim 6 in which the standardized physical channel establishment procedure is in accordance with 3GPP release 5.

8. A computer program for carrying out the method of claim 1, wherein the computer program is a series of operating instructions stored on a non-transitory computer readable medium that directs the operation of a processor when executed thereby.

9. A computer program product for storing computer program code on a non-transitory computer readable medium which, when run on a computer, carries out a method of controlling physical channel establishment in a wireless communication system, which method comprises:
   a.) determining if system frame number timing is to be maintained, and thereby determining if decoding of a system frame number is required as part of an initialization of a physical channel establishment procedure;
   b.) if the system frame number timing is to be maintained, thereby the decoding of the system frame number is not required to achieve the channel establishment, initializing a decoding of the system frame number to estimate the quality of a cell with which the physical channel is to be established; and
   c.) if the decoding of the system frame number fails, terminating the channel establishment procedure.

10. An apparatus for controlling physical channel establishment in a wireless communication system, comprising:
   a.) means for determining if system frame number timing is to be maintained, and thereby determining if decoding of a system frame number is required as part of an initialization of a physical channel establishment procedure;
   b.) means for initializing, if the system frame number timing is to be maintained, thereby the decoding of the system frame number is not required to achieve the channel establishment, a decoding of the system frame number to estimate the quality of a cell with which the physical channel is to be established; and c.) means for terminating, if decoding of the system frame number fails, the channel establishment procedure.

11. A user equipment of a mobile communications system including apparatus according to claim 10.

* * * * *